United States Patent
Wienhold (10) Patent No.: US 7,147,409 B2
(45) Date of Patent: Dec. 12, 2006

(54) DRILL COUNTERSINK ASSEMBLY

(76) Inventor: James L. Wienhold, 2310 Chestnut Ave. W., Minneapolis, MN (US) 55405

( * ) Notice: Subject to any disclaimer, the term of this patent is extended or adjusted under 35 U.S.C. 154(b) by 0 days.

(21) Appl. No.: 11/082,379

(22) Filed: Mar. 17, 2005

(65) Prior Publication Data

US 2005/0207856 A1 Sep. 22, 2005

Related U.S. Application Data

(60) Provisional application No. 60/553,996, filed on Mar. 17, 2004.

(51) Int. Cl.
B23B 51/08 (2006.01)
B23B 51/10 (2006.01)

(52) U.S. Cl. ............... 408/1 R; 408/118; 408/191; 408/192; 408/225

(58) Field of Classification Search ............ 408/1 R, 408/118, 191, 192, 225, 117, 189, 193, 196, 408/223, 224, 713, 197, 202
See application file for complete search history.

(56) References Cited

U.S. PATENT DOCUMENTS

| | | | | |
|---|---|---|---|---|
| 94,416 A | * | 8/1869 | Jincks | 408/193 |
| 298,248 A | * | 5/1884 | Smart | 408/193 |
| 468,857 A | * | 2/1892 | Williams et al. | 408/191 |
| 532,472 A | * | 1/1895 | Minnich | 408/146 |
| 679,693 A | * | 7/1901 | Burkhart | 408/191 |
| 857,344 A | * | 6/1907 | Henry | 408/192 |
| 1,095,185 A | * | 5/1914 | Broadbent et al. | 408/192 |
| 1,111,410 A | * | 9/1914 | Semon | 408/191 |
| 1,464,298 A | * | 8/1923 | Stein | 408/201 |
| 1,479,325 A | * | 1/1924 | Schubnel | 408/202 |
| 1,561,463 A | * | 11/1925 | De Rochemont | 408/201 |
| 2,344,143 A | * | 3/1944 | Harding | 408/192 |
| 2,429,375 A | * | 10/1947 | Smith | 279/102 |
| 2,661,642 A | * | 12/1953 | Marcucci | 408/191 |
| 2,826,104 A | * | 3/1958 | Morin | 408/224 |
| 2,832,386 A | * | 4/1958 | Van Dalen | 408/193 |
| 2,863,340 A | * | 12/1958 | Ingram | 408/193 |
| 2,927,614 A | * | 3/1960 | Ransom | 408/192 |
| 4,167,363 A | * | 9/1979 | Whitesel | 408/201 |
| 4,869,625 A | * | 9/1989 | Stone | 408/118 |
| 4,997,322 A | * | 3/1991 | Wells et al. | 408/201 |

(Continued)

FOREIGN PATENT DOCUMENTS

DE 3828036 A1 * 2/1990

(Continued)

*Primary Examiner*—Monica Carter
*Assistant Examiner*—Michael W. Talbot
(74) *Attorney, Agent, or Firm*—Westman, Champlin & Kelly (57) ABSTRACT

A combination tool for drilling a bore and countersink for that bore includes a countersink member. The countersink member comprises a longitudinal sleeve with a first end and a second end. The sleeve contains a longitudinal bore through the sleeve from the first end to the second end sized to receive a drill bit. A radial slot through the wall of the sleeve is in communication with the longitudinal bore. The sleeve has a cutting edge connected to the first end of the sleeve. A collar containing a radial bore through its wall is slidably inserted over the sleeve. The radial bore is in communication with the radial slot of the countersink member. A fastening mechanism extends through the radial bore of the collar and slot of the countersink member to engage the drill bit inserted through the longitudinal bore of the countersink member and thus secure the drill bit, countersink member and collar relative to one another.

20 Claims, 6 Drawing Sheets

U.S. PATENT DOCUMENTS

| | | | |
|---|---|---|---|
| 5,066,172 A | * 11/1991 | Swim, Jr. | ................. 408/1 R |
| 5,482,410 A | 1/1996 | Chambers | |
| 5,722,805 A | 3/1998 | Griffin | |
| 5,827,019 A | 10/1998 | Morrissey | |
| 5,947,654 A | 9/1999 | Blankenship et al. | |
| 2004/0057804 A1 | 3/2004 | Jager et al. | |
| 2005/0084347 A1 | * 4/2005 | Clark | ........................ 408/189 |

FOREIGN PATENT DOCUMENTS

| | | | |
|---|---|---|---|
| GB | 2018644 A | * | 10/1979 |
| JP | 10146709 A | * | 6/1998 |

* cited by examiner

Figure 1:
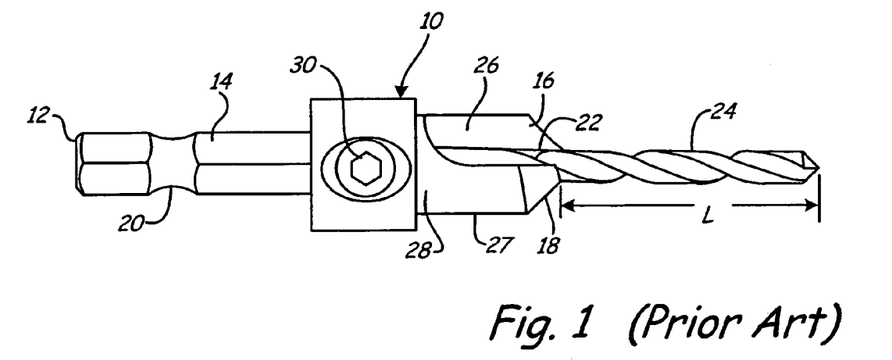
FIG. 1 is a side view of a prior art countersink tool.
Figure 2:
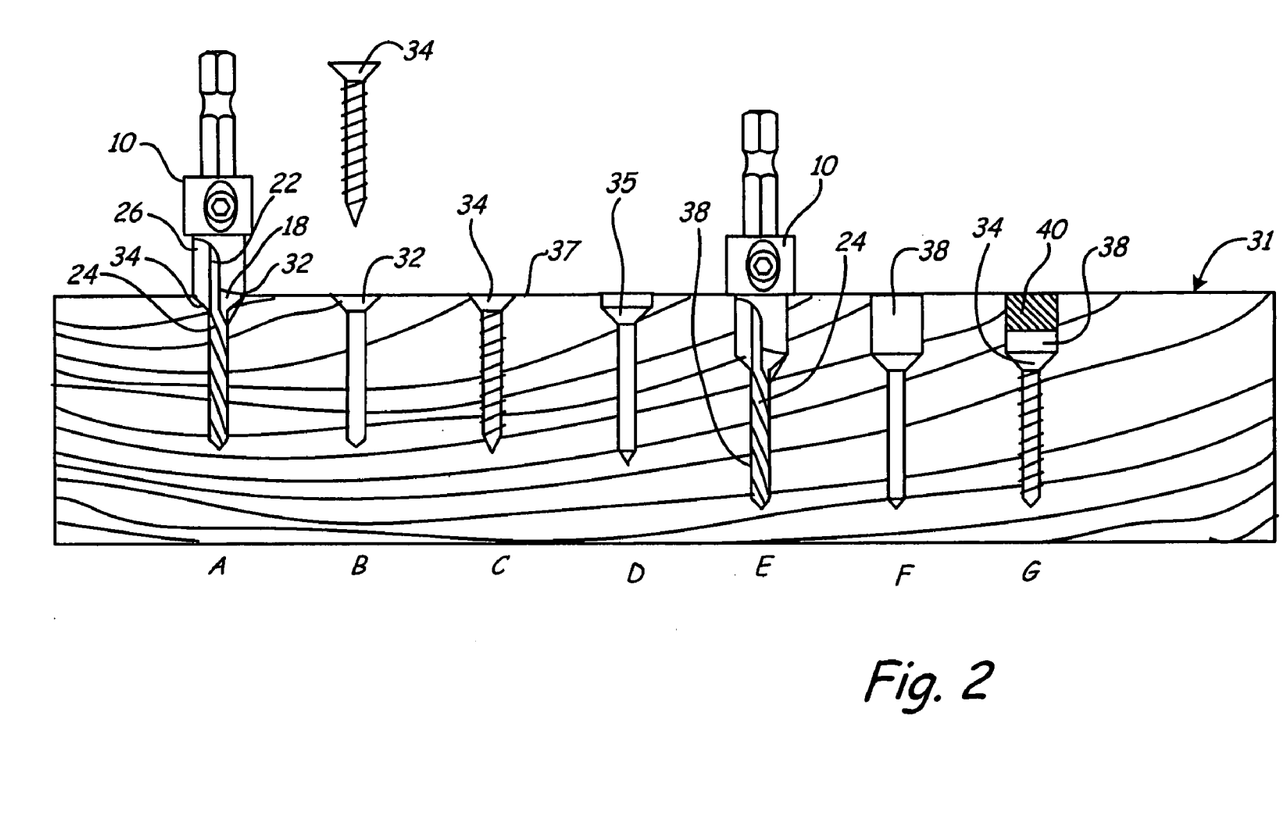
FIG. 2 is a cross-sectional view of holes bored in a substrate with the prior art countersink shown in FIG. 1.
Figure 3:
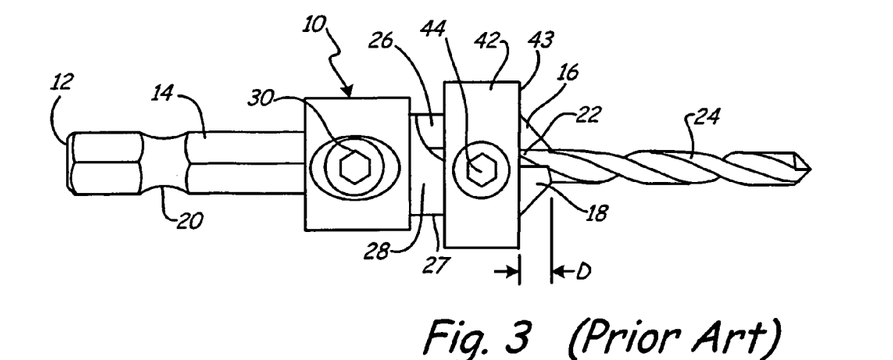
FIG. 3 is a side view of a prior art countersink tool with an adjustable collar mounted thereto.
Figure 4:
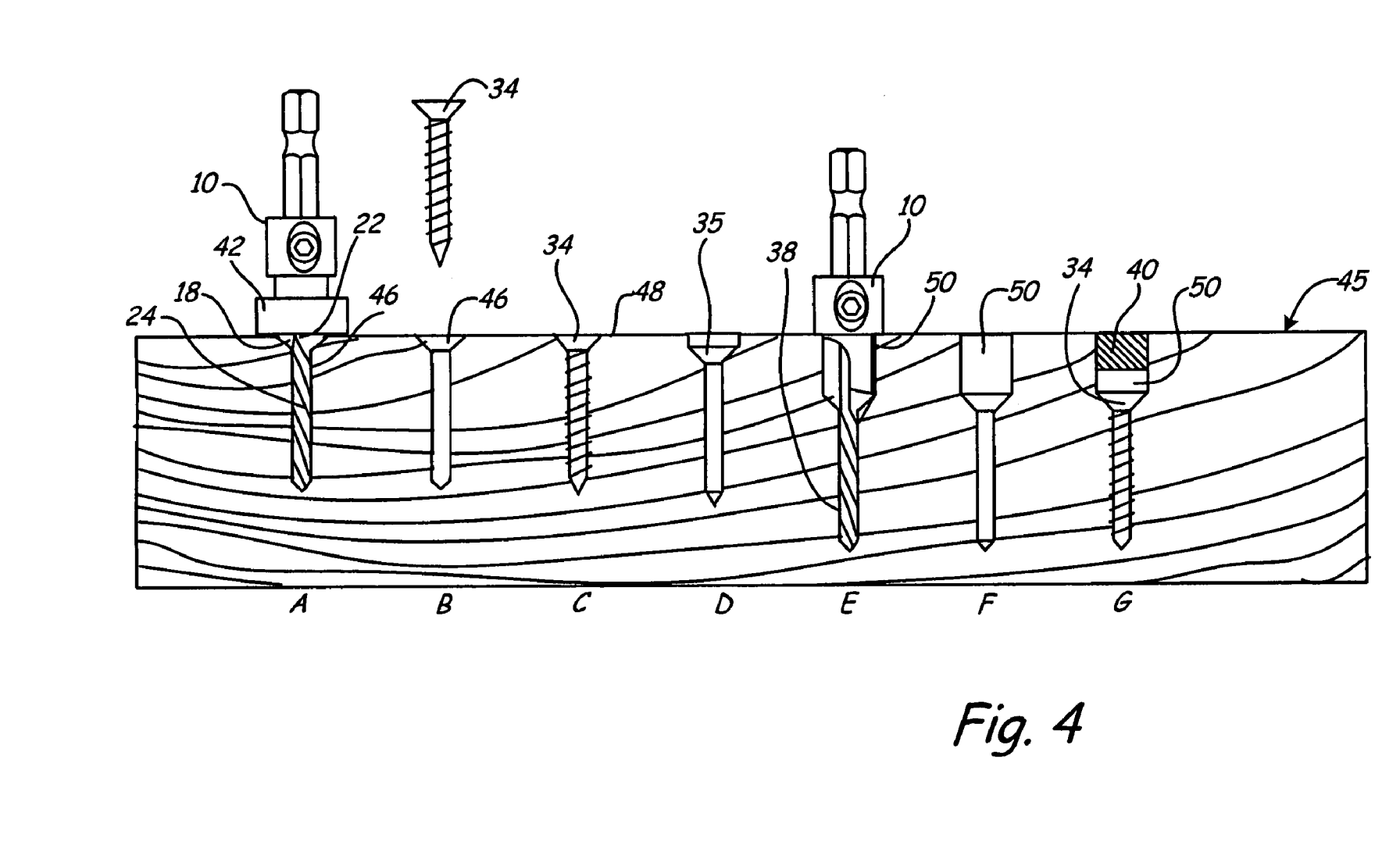
FIG. 4 is a cross-sectional view of holes bored in a substrate with the prior art countersink shown in FIG. 3.

DRILL COUNTERSINK ASSEMBLY
>
> ## CROSS-REFERENCE TO RELATED APPLICATION(S)
>
> This application claims priority from provisional application No. 60/553,996 filed Mar. 17, 2004, for "Drill Countersink Assembly" by James L. Wienhold, which is hereby incorporated by reference.
>
> ## BACKGROUND OF THE INVENTION
>
> Drill countersinks are known in the art for holding a drill bit, including the exemplary countersink shown in FIG. 1. A countersink tool 10 includes a proximal end 12 with a shank 14 and a distal end 16 with a cutting edge 18. The shank 14 contains an annular groove 20 for connection with an automatic or "quick-release" coupling of a drill chuck or tool holder (not shown). The shank 14 is of any suitable shape for rotatably coupled engagement with a power source, using either a male or female style coupling. Although tool shanks having hex cross-section shapes are shown herein, any shape formed to inhibit rotation of the tool relative to a tool holder or power source will suffice. Likewise, the annular groove 20 formed on the tool shank 14 is not necessary for effective automatic coupling and release of the tool relative to the tool holder or power source.
>
> The countersink tool 10 includes a longitudinal bore 22 extending from the cutting edge 18, the bore 22 being adapted for receiving a drill bit 24 therein. The countersink tool 10 includes a body 27 having an outer wall 28 with a flute 26 formed at the distal end 16, which includes the cutting edge 18. The drill bit 24 is held in place within the bore 22 by a set screw 30 which extends through the body 27 to engage the drill bit 24. Loosening the set screw 30 releases the drill bit 24 to allow an operator to adjust the length L of the bit 24 extending from the bore 22, and tightening the set screw 30 secures the drill bit 24 within the bore 22 relative to the body 27.
>
> FIG. 2 is a cross-sectional view of holes bored in a board 31 with the prior art countersink tool 10 shown in FIG. 1. Step 2A illustrates the countersink tool 10, with drill bit 24, boring a hole 32, or counterbore, in the board 31 to an approximate depth for flush installation of a screw 34. The length L of the drill bit 24 extending from the cutting edge 18 of the bore 22 is adjustable to match the screw length. The outer diameter of the countersink, or flute 26, defines the counterbore diameter. Step 2B illustrates the hole 32 bored by the countersink tool 10 ready for screw 34 installation. Step 2C shows an installed screw 34 with a screw head 36 flush with a work surface 37 of the board 31.
>
> Step 2D shows a hole 35 in which the operator has bored the hole too deep for flush installation of the screw 34. In some instances the bore hole 32 may be too shallow for flush installation of the screw 34. Step 2E illustrates the countersink tool 10, with drill bit 24, boring a deeper hole 38 in the board 31 for recessed or covered screw installation. Step 2F illustrates the resultant hole bored 38 by the countersink in step 2E. Step 2G shows an installed screw 34 with a plug 40 inserted in the counterbore to cover the screw 34 and create a plug surface flush with the work surface of 37 of the board 31.
>
> The countersink tool 10 shown and described with respect to FIGS. 1 and 2 is a single-stage countersink with a single flute. Two-stage countersinks are also known in the art for forming a counterbore having two diameters. In addition, countersinks with more than one flute and/or set screws are also known in the art.
>
> FIG. 3 is a side view of the prior art countersink tool 10 shown in FIG. 1 holding a tool bit 24, and also including an adjustable stop collar 42 attached to the body 27 of the countersink tool 10. The stop collar 42 is placed around the flute 26 or flutes of the countersink tool 10 to prevent an operator from drilling a counterbore too deep with the countersink tool 10. The stop collar 42 includes a workpiece engagement surface 43 and a set screw 44 to secure the collar in place along the length of the body 27 of the countersink tool 10. Loosening the set screw 44 releases the stop collar 42 to permit an operator to adjust its position along the length of countersink tool 10 and tightening the set screw 44 secures the collar 42 in place relative to the body 27. Thus, the depth of the counterbore is adjustable in two ways, by adjusting the length L of the drill bit 24 extending from the bore 22 with the countersink set screw 30, and by adjusting the position of the stop collar 42 along the length of the countersink tool 10 with the stop collar set screw 44 (thus fixing a counterbore depth D between the work engagement surface 43 of the stop collar 42 and the cutting edge 18 of the body 27 of the countersink tool 10, as seen in FIG. 3).
>
> FIG. 4 is a cross-sectional view of holes bored in a board 45 by the countersink tool 10 with attached stop collar 42 shown in FIG. 3. Step 4A illustrates the countersink tool 10 fitted with the stop collar 42 boring a hole 46, or counterbore, in the board 45 to an exact depth for flush installation of a screw 34. The length L of the drill bit 24 extending from the cutting edge 18 of the bore 22 is adjustable to match the screw length, and the depth D of the counterbore is separately adjustable to match the depth of the screw head. Step 4B illustrates the hole 46 bored by the countersink tool 10 ready for screw 34 installation. Step 4C shows an installed screw 34 with a screw head flush with a work surface 48 of the board 45. Step 4D illustrates that, in comparison to the hole 35 shown in step 2D the stop collar 42 aids in boring a hole 46 with a consistent counterbore depth for flush installation of a wood screw.
>
> Steps 4E–4G are similar to steps 2E–2G described above with respect to FIG. 2. Step 4E illustrates the countersink tool 10 (with the stop collar 42 removed) boring a deeper hole 50 in the board 45 for recessed or covered installation. Step 4F illustrates the resultant hole 50 bored by the countersink tool 10 in step 4E, and step 4G shows an installed screw 34 with a plug 40 inserted in the counterbore to cover the screw 34 and create a plug surface flush with the work surface 48 of the board 45.
>
> ## BRIEF SUMMARY
>
> In one aspect, the present invention is a combination tool comprising a countersink member, wherein the countersink member comprises a longitudinal sleeve with a cutting edge and contains a longitudinal bore through the sleeve to receive the drill bit. A radial slot through the wall of the sleeve is in communication with the longitudinal bore. A collar containing a radial bore in communication with the radial slot of the countersink member is slidably inserted over the sleeve. A fastening mechanism extends through the radial bore of the collar and slot of the countersink member to engages the drill bit inserted through the longitudinal bore of the countersink member.
>
> In another aspect, the present invention is an improvement in a countersink assembly for receiving a drill bit, wherein the countersink assembly has a countersink cutting face. The improved countersinking assembly comprises a single fastener mechanism which has a surface which engages a drill bit disposed in the countersink assembly for fixing the operative length of the drill bit. The single fastener mechanism also has a workpiece engagement surface for fixing the operative depth of a bore which can be formed in a workpiece by a countersink which can be formed in the workpiece by the countersink cutting face on the countersink assembly.

In another aspect, a method of preparing a countersink tool for use in forming a bore with a tool bit and a countersink at an open end of the bore is provided. First, a drill bit is axially inserted into a longitudinal bore of a countersink tool body so that a desired length of the tool bit extends from a first countersink cutting end of the countersink tool body. Next, a collar having a workpiece engaging surface along the countersink tool body is longitudinally aligned, so that the surface is longitudinally spaced a desired depth from the first countersink cutting end of the countersink tool body. The drill bit, collar, and countersink body are secured together using a single fastener, thereby fixing an operative bore drilling length for the tool bit and an operative countersink depth for the first countersink cutting end of the countersink tool body.

The above summary is not intended to describe each disclosed embodiment or every implementation of the present invention. The figures and the detailed description which follow more particularly exemplify illustrative embodiments.

BRIEF DESCRIPTION OF THE DRAWINGS

The present invention will be further explained with reference to the attached figures, wherein like structure is referred to by like numerals throughout the several views.

While the above-identified drawing figures set forth several embodiments of the invention, other embodiments are also contemplated, as noted in the discussion. In all cases, this disclosure presents the present invention by way of representation and not limitation. It should be understood that numerous other modifications and embodiments can be devised by those skilled in the art which fall within the scope and spirit of the principles of this invention.

DETAILED DESCRIPTION

Figure 5A:
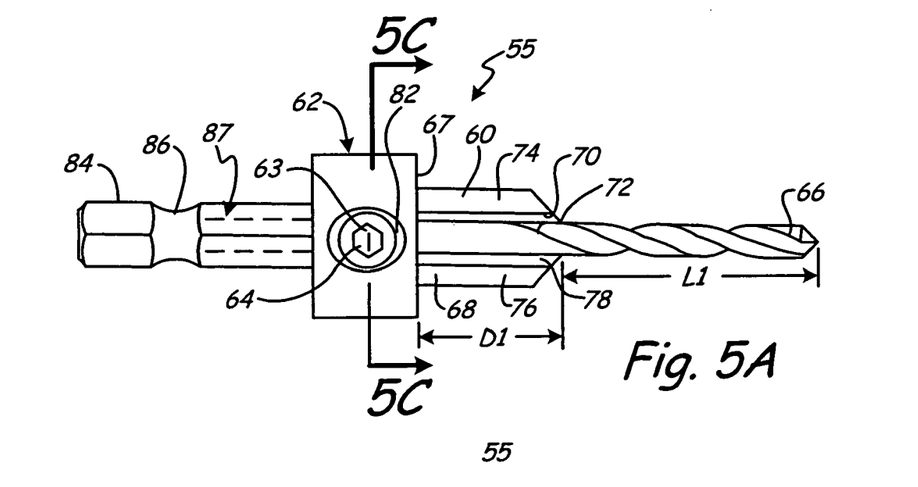
FIG. 5A is a side view of a countersink assembly of the present invention with a stop collar in a first position.
Figure 5B:
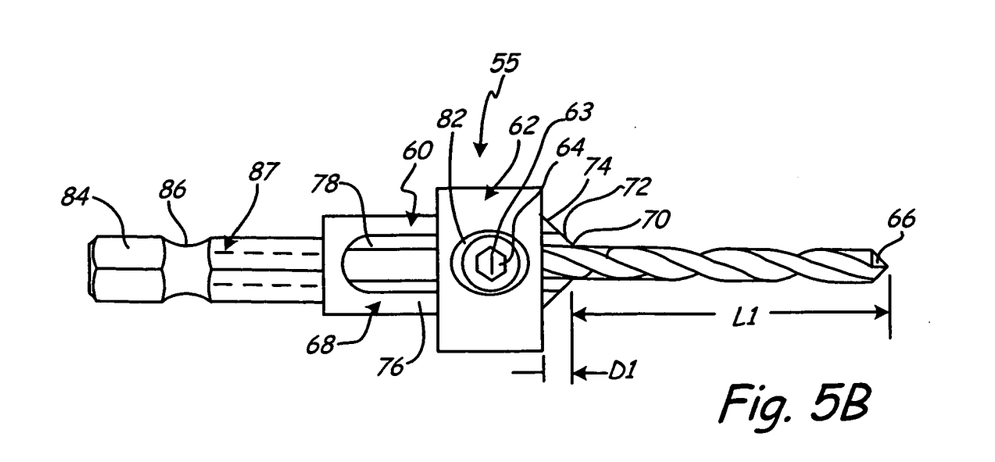
FIG. 5B is a side view of the countersink assembly shown in FIG. 5A with the stop collar in a second position.

FIGS. 5A and 5B are side views of one embodiment of my inventive countersink assembly 55, which comprises a countersink 60 and stop collar 62 assembly of the present invention. The countersink 60 and stop collar 62 assembly includes a single set screw 64 for adjusting a length L1 of a drill bit 66 extending from the countersink 60 and adjusting the position the stop collar 62 along the length of the countersink 60. The adjustable stop collar 62 is movable between a first position (shown in FIG. 5A) and a second position (shown in FIG. 5B), but may be secured in place at any point there between. The position of the stop collar 62 along the countersink 60 thus determines a depth D1 of the countersink which may be formed by the countersink assembly 55 (compare depth D1 in FIG. 5A with depth D1 in FIG. 5B).

The countersink 60 comprises a tubular sleeve 68 which includes a longitudinal bore 70 extending from a cutting edge 72, the bore 70 adapted for axially receiving a drill bit 66. A flute 74 forms an outer wall 76 of the bore 70, which includes an open ended radial slot 78. The radial slot 78 is aligned to extend substantially perpendicular to the longitudinal axis of the sleeve 68. The radial slot 78 extends completely through the sleeve 12 such that the radial slot 78 communicates with the longitudinal bore 70. The drill bit 66 is an ordinary twist drill bit commonly used in the art.

Figure 5C:
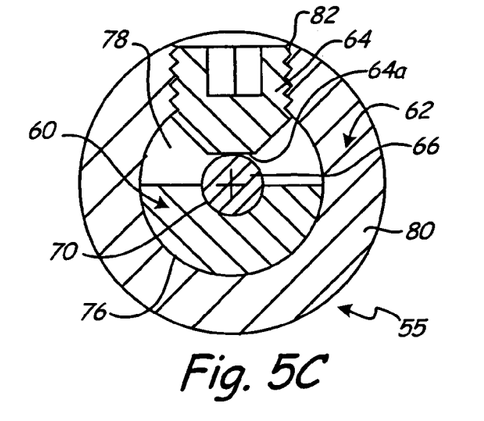
FIG. 5C is a cross-sectional view of the countersink assembly taken along line 5C of FIG. 5A.

The stop collar 62 comprises a cylindrical wall 80 with the inner diameter being nominally larger than the outer diameter of the outer wall 76 of the countersink 60 (See FIG. 5C). The stop collar 62 has a workpiece engagement surface 67 and a radial bore 82 for reception of a fastener to secure the collar 62 about the countersink 60 and drill bit 66. In one embodiment, the bore 82 is threaded to receive the set screw 64. The stop collar 62 is positioned about the sleeve 68 such that the open ended slot 78 receives the set screw 64. The set screw 64 is movable along the slot 78 as the stop collar 64 is moved between the first position (shown in FIG. 5A) and the second position (shown in FIG. 5B).

Both the drill bit 66 and stop collar 62 are held in place within the bore 70 by the set screw 64. Set screw 64 contains a hexagonal cavity 63 to allow reception of an allen wrench for securing the set screw 64 within the threaded bore 82. Loosening the set screw 64 releases the bit 66 to allow an operator to adjust the length L1 of the bit 66 extending from the bore 70 from the cutting edge 72, and releases the stop collar 62 to allow an operator to adjust its position along the length of countersink 60 (and thus to adjust the depth D1 of the screw head countersink to be formed from the work engagement surface 67 of the stop collar 62 to the cutting edge 72 of the countersink 60). As seen in FIG. 5C, tightening the set screw 64 secures the bit 66 within the bore 70 and secures the collar 62 in place relative to the countersink 60. Thus, with manipulation of a single fastener (e.g., a set screw), the relative positions of the effective drill bit length and screw head countersink depth can be fixed. The drill bit, countersink, and collar are fixed relative to one another by the single fastener and manipulation step.

The countersink 60 is attached to a shank 84. The shank 84 contains an annular groove 86 for connection with an automatic or "quick-release" coupling of a drill (not shown). The shank 84 is of any suitable shape for rotatably coupled engagement with a power source, using either a male or female style coupling. Although shown as having hex cross-section shape, any shape formed to inhibit rotation of the tool relative to a tool holder or power source will suffice. Likewise, the annular groove 86 formed on the tool shank 84 is not necessary for effective automatic coupling and release of the tool relative to the tool holder or power source. In one embodiment, the shank 86 contains a longitudinal bore 87 (shown in phantom) concentrically aligned with the longitudinal bore 70 of the countersink 60. This allows shank 86 to receive a portion of drill bit 66 which provides further adjustment for hole depth L1 when using the drill countersink assembly 55.

Figure 5D:
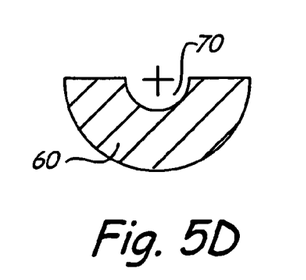
FIG. 5D is a cross-sectional view of the countersink taken along line 5C of FIG. 5A.

FIG. 5C is a cross-sectional view of the countersink 60 and stop collar 62 assembly shown in FIG. 5A, as taken along line 5C—5C in FIG. 5A and FIG. 5D is a cross-sectional view of the countersink 60 alone shown in FIG. 5A, as taken along line 5C—5C in FIG. 5A. As illustrated, in one embodiment the countersink 60 is semi-circular in cross section, with the stop collar 62 being circular in cross section (other shapes would suffice, so long as the collar is moveable longitudinally along the countersink). The drill bit 66 is also typically circular in cross section and fits into the corresponding longitudinal bore 70 of the countersink 60. Set screw 64 extends through a cooperatively threaded radial bore in the stop collar 62 and has an end surface 64a which engages and hold drill bit 66 against the countersink 60.

Figure 6A:
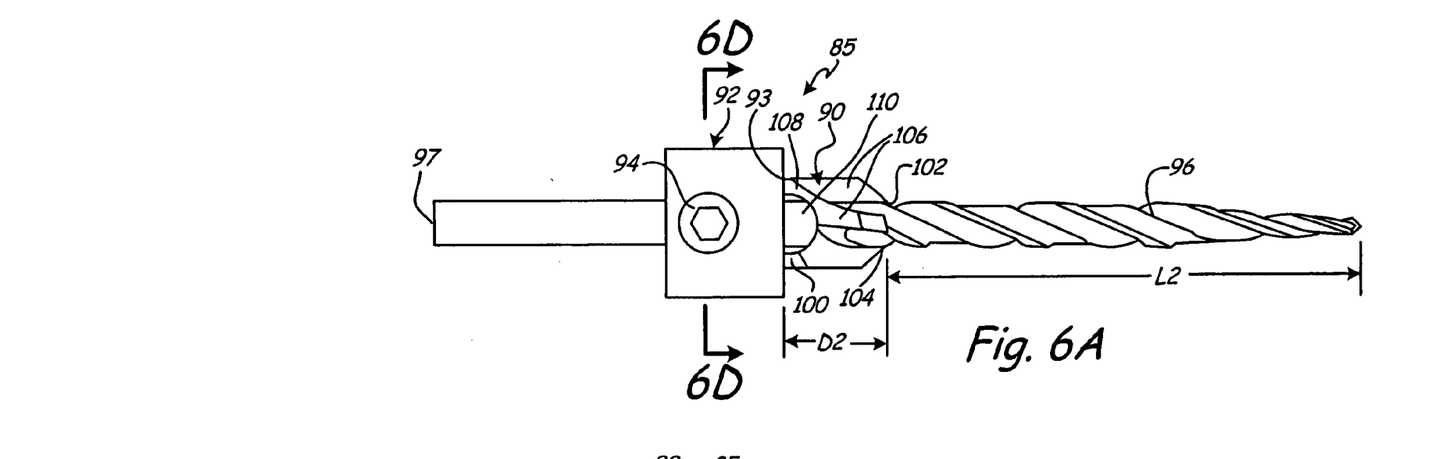
FIG. 6A is a side view of another embodiment of the countersink assembly of the present invention with a stop collar in a first position.
Figures 6B, 6C:
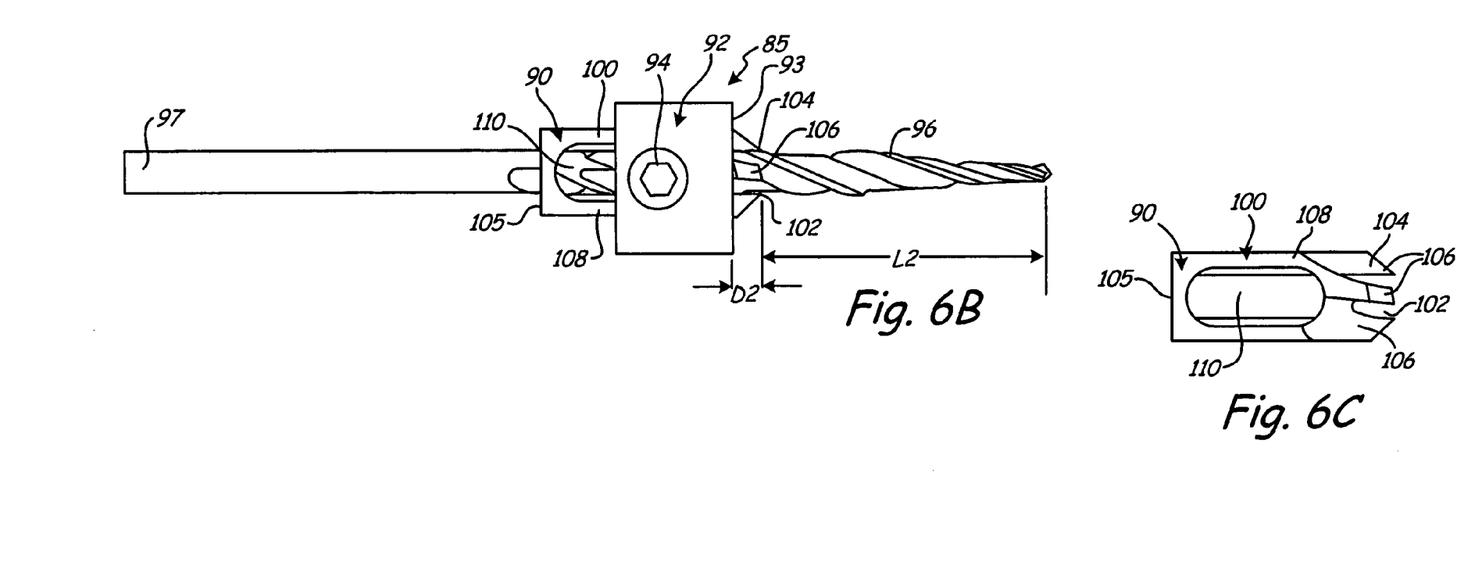
FIG. 6B is a side view of the countersink shown in FIG. 6A with the stop collar in a second position.
FIG. 6C is a side view of the countersink member of the countersink assembly shown in FIG. 6A.

FIGS. 6A and 6B are side views of another embodiment of my inventive countersink assembly 85 which comprises a countersink 90 and stop collar 92 assembly. The countersink 90 and stop collar 92 assembly includes a single set screw 94 for adjusting a length L2 of a drill bit 96 extending from the countersink 90 and adjusting the position of the stop collar 92 along the length of the countersink 90. The adjustable stop collar 92 is movable between a first position (shown in FIG. 6A) and a second position (shown in FIG. 6B). In addition, the countersink 90 is movable along the length of the drill bit 96 to adjust the length of the bit 96 for drilling. The position of the stop collar 92 along the countersink 90 thus determines a depth D2 of the countersink which may be formed by the countersink assembly 85 (compare depth D2 in FIG. 6A with depth D2 in FIG. 6B).

The countersink 90 is a multi-flute countersink, as seen in FIG. 6C. The countersink comprises a sleeve 100 which includes a longitudinal bore 102 extending from a distal cutting edge 104 to a proximal end 105, which is adapted for receiving the drill bit 96. Flutes 106 form a distal portion of an outer wall 108 of the bore 102, which includes a close ended radial slot 110 in communication with the longitudinal bore 102. When the assembled (FIGS. 6A and 6B), the stop collar 92 is positioned about the countersink 90 such that the close ended slot 110 is aligned with a set screw 94 that is threadably received in the stop collar 92. The set screw 94 is movable along the slot 110 as the stop collar 92 is moved between the first position (see, e.g., FIG. 6A) and the second position (see, e.g., FIG. 6B). In the illustrated embodiment, the drill bit 96 is a taper-point drill bit commonly used in the art. The stop collar 92 and set screw 94 are similar in structure and function to those previously described as stop collar 62 and set screw 64. In this embodiment, a proximate end 97 of the drill bit 96 directly attaches the countersink assembly 85 to a drill chuck.

Figure 6D:
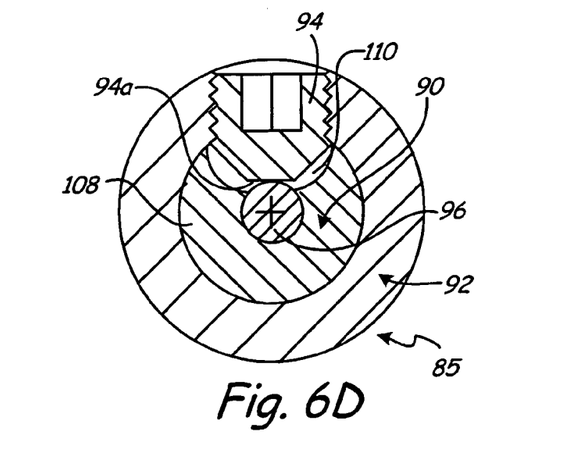
FIG. 6D is a cross-sectional view of the countersink assembly taken along line 6D of FIG. 6A.

Both the drill bit 96 and stop collar 92 are held in place within the bore 102 by the set screw 94, which has an end surface 94a for the engaging the drill bit 96. Loosening the set screw 94 releases the drill bit 96 so that an operator can move the countersink 90 relative to the drill bit 94 to adjust the length L2 of the bit 96 extending from the bore 102. Likewise, loosening the set screw 94 also releases the stop collar 92 to allow an operator to adjust its position along the length of countersink 90 (and thus adjust the depth D2 of the screw head countersink to be formed from a work engagement surface 93 of the stop collar 92 to the cutting edge 104 of the countersink 90). As seen in FIG. 6D, tightening the set screw 94 secures the bit 96 within the bore 102 and secures the collar 92 in place relative to the countersink 90. Thus with manipulation of a single fastener (e.g., a set screw), the relative positions of the effective drill bit length and screw head countersink can be fixed. The drill bit, countersink, and collar are all fixed relative to one another by the single fastener and manipulation step.

Figure 6E:
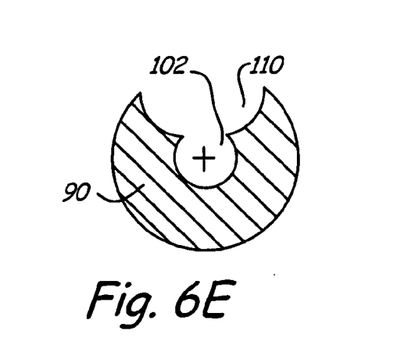
FIG. 6E is a cross-sectional view of the countersink taken along line 6D of FIG. 5A.

FIG. 6D is a cross-sectional view of the countersink 90 and stop collar 92 assembly shown in FIG. 6A, as taken along line 6D—6D in FIG. 6A, and FIG. 6E is a cross-sectional view of the countersink 90 alone shown in FIG. 6A, as taken along line 6D—6D in FIG. 6A. In this embodiment, the countersink 90 cross section is the majority of a circle (approximately 270 degrees), and the collar 92 is circular in cross section (other shapes will suffice, so long as the collar is movable longitudinally along the countersink). The drill bit 96 is typically circular in cross section and mates with the corresponding longitudinal bore 102 of the countersink 90. Set screw 94 extends through a cooperatively threaded radial bore in the collar 92 to engage and hold drill bit 96 against the countersink 90. The slot 110 is smaller than the slot 78 that illustrated in FIGS. 5A–5D leaving more material for countersink 90. This adds to the structural integrity of wall 108 of the countersink 90 allowing for multiple flutes 106 which provide multiple cutting surfaces for cutting edge 104.

The present invention is a countersink having a single fastener that an operation manipulates to secure and adjust a drill bit held by the countersink and a stop collar attached to the countersink. The improved countersink simplifies use by an operator and manufacture of the countersink. A single fastener countersink allows an operator to bore either flush or deep holes without adding or removing a part from the countersink. The countersink includes fewer parts for simplified manufacturing. Current countersinks are sold without stop collars, which may be purchased separately and attached to the countersink for use. The present invention is sold as a single unit, thereby lowering the cost, improving efficiency in the field and reducing lost parts.

With the above disclosed countersink assembly tool, a method of preparing a countersink tool for use in forming a bore with a tool bit and a countersink at an open end of the bore is provided. First, a drill bit is axially inserted into a longitudinal bore of a countersink tool body so that a desired length of the tool bit extends from a first countersink cutting end of the countersink tool body. Next, a collar having a workpiece engaging surface along the countersink tool body is longitudinally aligned, so that the surface is longitudinally spaced a desired depth from the first countersink cutting end of the countersink tool body. The drill bit, collar, and countersink body are secured together using a single fastener, thereby fixing an operative bore drilling length for the tool bit and an operative countersink depth for the first countersink cutting end of the countersink tool body.

Although the present invention has been described with reference to preferred embodiments, workers skilled in the art will recognize that changes may be made in form and detail without departing from the spirit and scope of the invention.

The invention claimed is:

1. A combination tool for drilling a bore and countersink, the tool comprising:
   a countersink member comprising a longitudinal sleeve having a first end and a second end, the sleeve containing a longitudinal bore through the sleeve from the first end to the second end, wherein the bore is sized to receive a drill bit, a radial slot through a wall of the sleeve having an elongate length extending along a longitudinal length of the sleeve in communication with the longitudinal bore, and a cutting edge located at the first end of the sleeve;
   a collar slidably inserted over the sleeve, the collar containing a radial bore through a wall of the collar, the radial bore being in communication with the radial slot of the countersink member; and
   a insertable through the radial bore of the collar and into the radial slot the countersink member and the fastening mechanism movable in the radial slot along the longitudinal length thereof to adjust a position of the collar relative to the countersink member and the fastening mechanism being tightened to engage the drill bit inserted into the longitudinal bore of the countersink member to secure the drill bit, countersink member, and collar relative to one another.

2. The combination tool of claim 1 wherein the radial bore is threaded.

3. The combination tool of claim 1 wherein the fastening mechanism is a set screw.

4. The combination tool of claim 1 wherein the radial slot is open-ended to the cutting edge.

5. The combination tool of claim 1, and further comprising a shank portion comprising a first end and a second end, wherein the first end of the shank portion is connected to the second end of the countersink member, and wherein the shank portion contains a longitudinal bore in communication with the longitudinal bore through the sleeve of the countersink member.

6. The combination tool of claim 5 wherein the shank portion has a hexagonal cross section.

7. The combination tool of claim 6 wherein the shank portion further comprises an annular groove adjacent the second end of the shank portion.

8. The countersink assembly of claim 1 wherein the cutting edge of the countersink member comprises a single flutes.

9. The countersink assembly of claim 1 wherein the cutting edge of the countersink member comprises multiple flutes.

10. The combination tool of claim 1 wherein the radial slot is formed of a cut-out along a portion of the longitudinal length of the sleeve.

11. A method comprising the steps of:
    moving a fastening mechanism inserted through a radial bore in a collar within a slot of a countersink tool body, so that a workpiece engaging surface of the collar is longitudinally adjusted to a desired depth relative to a cutting end of the countersink tool body; and
    tightening the fastening mechanism to secure drill bit inserted into a longitudinal bore of the countersink tool body relative to the collar and the countersink tool body.

12. The method of claim 11 and comprising the step of:
    inserting the fastening mechanism into the radial bore in the collar and the slot of the countersink tool body prior to moving the fastening mechanism within the slot of the countersink tool body.

13. The method of claim 11 and comprising the step of:
    adjusting a position of the drill bit within the longitudinal bore of the countersink tool body prior to tightening the fastening mechanism.

14. The method of claim 11 and further comprising the step of:
    inserting the drill bit into the longitudinal bore prior to tightening the fastening mechanism.

15. A tool comprising:
    a countersink body having an elongate sleeve including a longitudinal bore along a longitudinal length of the countersink body that is adapted to receive a drill bit therein and the countersink body including a cutting edge and a slot opened to the longitudinal bore and the slot having an elongate length extending along the longitudinal length of the countersink body; and
    a collar having a bore sized to receive a fastener and the collar being slidable along the countersink body and securable by the fastener to the countersink body through the slot at incremental positions along the elongate length of the slot and the number and placement of the incremental positions not limited to pre-set positions defined by pre-set holes on the countersink body.

16. The tool of claim 15 wherein the elongate slot has a width having a constant dimension along the elongate length of the slot.

17. The tool of claim 15 wherein the slot includes a width dimension sized to slidably adjust a position of the fastener along the elongate length of the slot.

18. The tool of claim 15 wherein the fastener is a set screw.

19. The tool of claim 15 wherein the slot has an opened end proximate to the cutting edge.

20. The tool of claim 15 and further comprising the drill bit in the longitudinal bore of the countersink body.

* * * * *

UNITED STATES PATENT AND TRADEMARK OFFICE
CERTIFICATE OF CORRECTION

| | | |
|---|---|---|
| PATENT NO. | : 7,147,409 B2 | Page 1 of 1 |
| APPLICATION NO. | : 11/082379 | |
| DATED | : December 12, 2006 | |
| INVENTOR(S) | : James L. Wienhold | |

It is certified that error appears in the above-identified patent and that said Letters Patent is hereby corrected as shown below:

Col. 7, Claim 1, line 17, change "a insertable through the radial bore of the collar and into" to --a fastening mechanism insertable through the radial bore of the collar and into--.

Col. 8, Claim 11, line 7, change "tightening the fastening mechanism to secure drill bit" to --tightening the fastening mechanism to secure a drill bit--.

Signed and Sealed this

Fourth Day of March, 2008

JON W. DUDAS
*Director of the United States Patent and Trademark Office*